United States Patent [19]
Fujio

[11] Patent Number: 5,421,932
[45] Date of Patent: Jun. 6, 1995

[54] FILM TUBE FOR PACKAGING ARTICLES AND METHOD FOR FORMING THE SAME

[75] Inventor: Masaaki Fujio, Osaka, Japan

[73] Assignee: Fuji Seal Industry Co., Ltd., Osaka, Japan

[21] Appl. No.: 111,088

[22] Filed: Aug. 24, 1993

[30] Foreign Application Priority Data

Sep. 17, 1992 [JP] Japan .................................. 4-275220

[51] Int. Cl.⁶ ............................................. B32B 31/00
[52] U.S. Cl. .................................. 156/192; 156/272.6; 156/324
[58] Field of Search ...................... 156/272.6, 324, 192

*Primary Examiner*—Chester T. Barry
*Attorney, Agent, or Firm*—Jordan and Hamburg

[57] ABSTRACT

A film tube has a substrate having opposed side edges. A first surface of the film is subjected to corona electrical discharge treatment. The first surface of the film is provided thereon with a printing ink layer. A first edge region along one of the opposed side edges of the first surface of the film is provided with an adhesive layer. A second edge region along an opposed side edge of a second surface of the film is activated by the corona electrical discharge treatment. The first edge region and the second edge region are overlapped and bonded with one another through the adhesive layer. A method for making the film tube is also provided.

7 Claims, 4 Drawing Sheets

FILM TUBE FOR PACKAGING ARTICLES AND METHOD FOR FORMING THE SAME

BACKGROUND OF THE INVENTION

This invention relates to a film tube having a substrate which has a low wettability, for example polyolefine plastic film, or the like, such that printing ink or adhesive cannot be readily applied thereon, unless it is treated to increase wettability. This invention also relates to a method for forming the film tube by sealing the same by overlapping side edges one another.

A conventional method for successively forming a film tube which is generally used as a tubular label for packaging articles, involves rolling up a continuous web of a film. One surface of the film has a printing ink layer. The film is then unwound and, simultaneously, opposite longitudinal side edges of the film are overlapped. The overlapping side edges of the film are bonded or heat-sealed together.

Polyethylene film, polypropylene film, or the like, in the form of a heat-shrinkable film or stretch film, is generally used as a material for packaging articles and a tubular label for displaying an article's name or the like thereon. The shrinking force of the heat-shrinkable film or the elastic stretching stress of the stretch film allows the film to tightly conform around the articles.

However, since polyolefine plastic film, including polyethylene film and polypropylene film, inherently have a low degree of wettability, printing ink, adhesive or the like cannot be readily applied thereon. Wettability can be increased by activating a surface of the film. It is subjected to surface treatment, typically corona electrical discharge treatment, prior to applying the printing ink or the adhesive thereon. The wettability of the activated surface is preferably more than 37 dyn/cm, which is determined by the JIS (Japanese Industrial Standard) K6768 testing method. Thus, the activated surface has increased adhesive strength.

In this method, only one surface of the film is subjected to corona electrical discharge treatment to avoid blocking (coalescence) which may occur in a roll of a continuous web of the film when both surfaces of the film are subjected to corona electrical discharge treatment. The blocking may damage the film.

However, it is conceivable that when only one surface of the film is subjected to corona electrical discharge treatment, the other surface of the film will still have low wettability. That is, it is difficult to obtain sufficient adhesive strength on the longitudinal side edges of the film, opposite the side edges subjected to surface treatment, after the side edges of the film are bonded with one another by adhesive. Such poor adhesive strength may cause undesirable separation of the overlapping side edges of the film from one another. To overcome this drawback, the width of the overlapping side edges may be enlarged, or the overlapping side edges; may be heat-sealed to one another to obtain sufficient adhesive strength.

However, enlarging the film may result in an increase in the cost of the film. In addition, it is difficult to obtain sufficient adhesive strength due to the fact that when the film tube, formed from the stretch film, is forcibly stretched to tightly conform around articles by using the elastic stretching stress of the stretch film as a tightening force, the elastic stretching stress is applied onto the bonded side edges of the film as shearing stress, which may readily cause separation of the bonded side edges of the film. Further, it is difficult to maintain the bond strength of the side edges of the film long enough to tightly package the articles for a prolonged period of time.

In a heat sealing method, it is possible to obtain sufficient-bond strength in the overlapping region of the film by properly controlling the temperature for the heat sealing. However, when using a film having a low melting point, such as polyethylene film, as a substrate of the film tube, it is difficult to control the temperature for heat sealing. As a result, the overlapping side edges of the film may be unsecurely sealed with one another. Accordingly, it is difficult to successively form the film tube effectively.

SUMMARY OF THE INVENTION

It is an object of the present invention to provide a film tube having enough adhesive strength to securely wrap products therewith, even when using a low wettable material such as polyethylen film, polyolefine plastic film or the like as a substrate of the film tube.

It is another object of the present invention to successively and readily form the film tube easily and inexpensively.

It is a futher object of the present invention to provide a method for forming the film tube by sealing opposed longitudinal side edges of the film.

In accordance with the present invention, there is provided a film tube including a tube made of a polyolefine plastic film which has opposed side edges. A first surface of the film, having a printing ink layer, is subjected to corona electrical discharge treatment. A first edge region, along either one of the opposed side edges of the first surface of the film has an adhesive layer. A second edge region, along an opposed side edge of a second surface of the film is activated by corona electrical discharge treatment, such that the first edge region and the second edge region are overlapped and bonded with one another through the adhesive layer.

There is further provided a film tube including a tube made of a polyolefine plastic film having opposed side edges. A first surface of the film is subjected to corona electrical discharge treatment. The first surface of the film has a printing ink layer. A second edge region, along either one of the opposed side edges of a second surface of the film is activated by corona electrical discharge treatment. The second edge region has an adhesive layer, such that the second edge region and a first edge region along an opposed side edge of the first surface are overlappled and bonded with one another through the adhesive layer.

There is further provided a method for making a film tube including unwinding a roll of a continuous web of a polyolefine plastic film having a first surface and a second surface, and opposed longitudinal side edges, wherein the first surface of the film is priorly subjected to corona electrical discharge treatment and is provided with a printing ink layer. Next, a second edge region along either one of the opposed longitudinal side edges of the second surface of the film is subjected to corona electrical discharge treatment. Then, an adhesive layer is applied on a first edge region along an opposed longitudinal side edge of the first surface of the film. Finally, the first edge region is overlapped and bonded to the second edge region through the adhesive layer.

There is further provided another method for making a film tube including unwinding a roll of a continuous web of a polyolefine plastic film having a first surface and a second surface, and opposed lontitudinal side edges, wherein the first surface of the film is priorly subjected to corona electrical discharge treatment and is provided with a printing ink layer. Next, a second edge region, along either one of the opposed longitudinal side edges of the film, is subjected to corona electrical discharge treatment. Then, an adhesive layer is applied on the second edge region. Finally, the second edge region and a first edge region along an opposed longitudinal side edge of the first surface are overlapped and bonded through the adhesive layer.

In the present invention, the overlapping side edges of the film can be securely bonded with one another to form the film tube used for a tube label, or the like, even when the film material used as a substrate of the film tube is polyolefine plastic film, which has a low degree of wettability and poor adhesive strength to the adhesive layer. Therefore, the film tube of the present invention eliminates the necessity of enlarging the overlapping width of the film, while obtaining sufficient adhesive strength of the overlapping side edges. Thus, articles can be securely packaged under varying conditions with the tube film of the present invention in the form of a heat-shrinkable tube label, a stretch tube label or the like.

In the method of the present invention, even when the continuous web of polyolefine film is rolled up, the film can readily and smoothly be unwound without blocking the contacted surfaces of film, since one surface of the web of polyolefine film is not activated by the corona electrical discharge treatment and not provided with an adhesive layer, or the like, prior to being rolled up. In addition, since the corona electrical discharge treatment and the adhesive layer are applied on predetermined longitudinal side edges of the film downstream of unwinding of the film, the tube film, the longitudinal side edges of which are securely bonded with one another, can successively and readily be formed in the same manner as a method for sealing a commonly used plastic film.

BRIEF DESCRIPTION OF THE DRAWINGS

The above, and other objects, features and advantages of the present invention will become apparent from the detailed description read in conjunction with the accompanying drawings, which are given by way of illustration only, and thus are not limitative of the present invention, and wherein.

DETAILED DESCRIPTION OF THE PREFERRED EMBODIMENTS

Figure 1A:
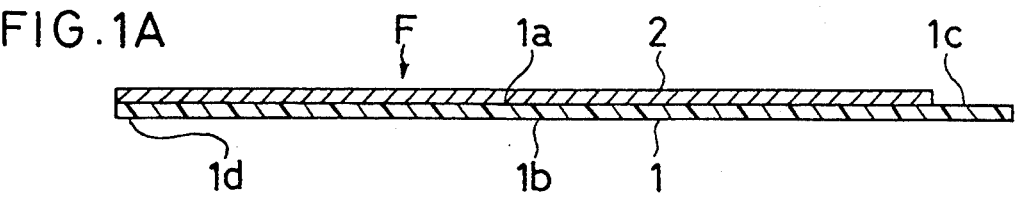
FIGS. 1A, 1B, 1C, 1D and 1E are sectional views illustrating one embodiment of the present invention.

FIGS. 1A, 1B, 1C, 1D and 1E illustrate the first embodiment of the present invention. In FIG. 1A, a film F includes a substrate 1 made of a low wettable plastic film such as a polyethylen film. The substrate 1 has opposed side edges. A first surface 1a of the substrate 1 is subjected to corona electrical discharge treatment in order to render a high degree of the wettability thereon. The wettability of the first surface 1a is preferably more than 37 dyn/cm, which is determined by the JIS (Japanese Industrial Standard) K6768 testing method. The first surface 1a is provided thereon with a printing ink layer 2 except for a first edge region 1c along either one of the side edges. The first edge region 1c, being the only exposed region of the first surface 1a, has a high degree of wettability, yet it is not covered with the printing ink layer 2. A second surface 1b of the film is not subjected to corona electrical discharge treatment, and, thus it has a low degree of wettability thereon.

Figure 1B:
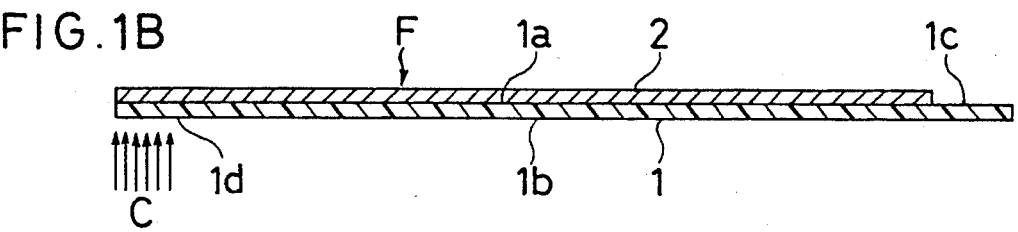
Figure 1C:
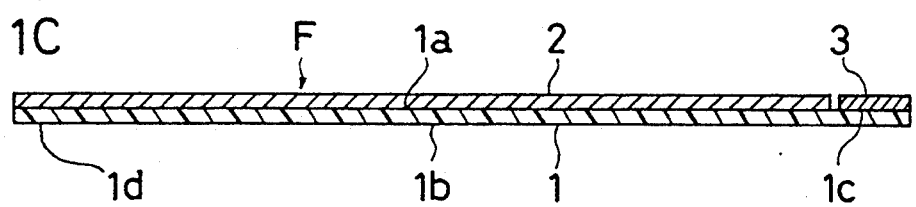
Figure 1D:
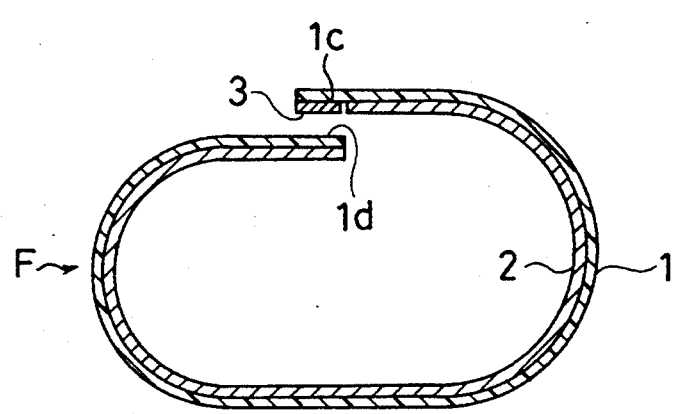
Figure 1E:
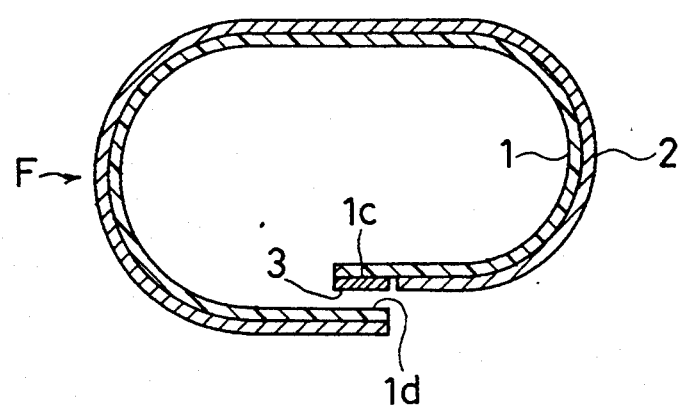

Referring to FIG. 1B, a second edge region 1d along an opposed side edge of the second surface 1b is subjected to corona electrical discharge-treatment C to activate the surface thereof. In FIG. 1C, an adhesive layer 3 is applied to the first edge region 1c. In FIG. 1D, the film F is formed into a tubular shape. The first edge region 1c and the second edge region 1d are overlapped and bonded with one another through the adhesive layer 3. In this embodiment, the printing ink layer 2 of the film tube faces inwardly. However, the film F may be formed into a tubular shape in reverse such that the printing ink layer 2 faces outwardly, as illustrated in FIG. 1E.

Figure 2A:
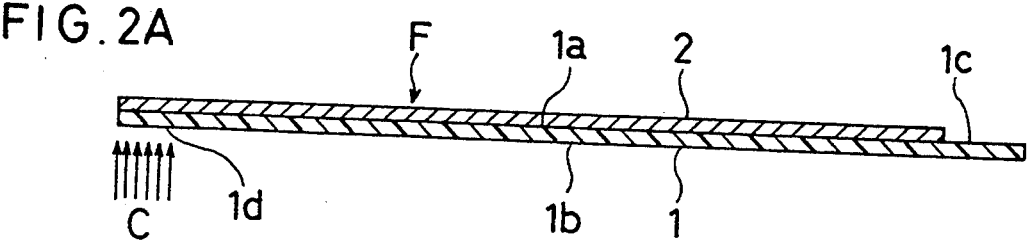
FIGS. 2A, 2B, 2C and 2D are sectional views illustrating another embodiment of the present invention.
Figure 2B:
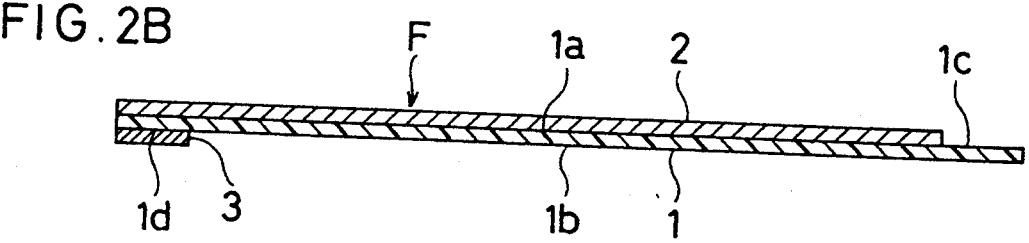
Figure 2C:
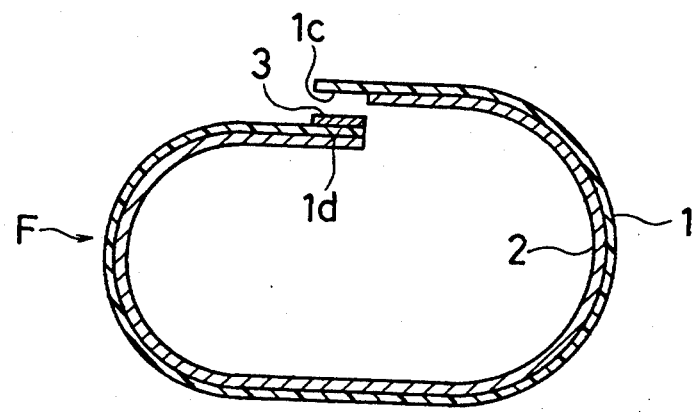
Figure 2D:
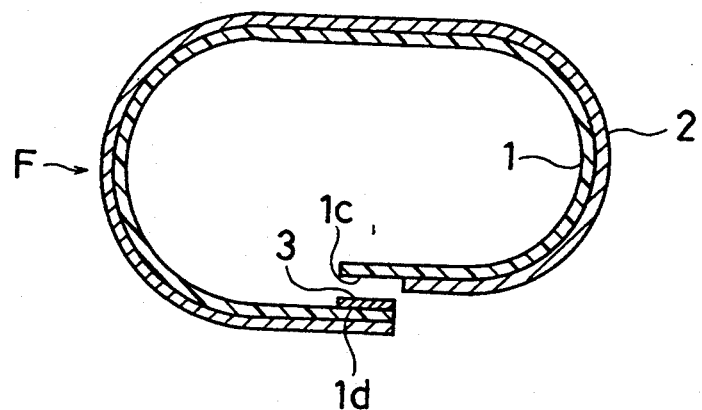

FIGS. 2A, 2B, 2C and 2D illustrate the second embodiment of the present invention. In FIGS. 2A and 2B, the first surface 1a of the substrate 1 is subjected to corona electrical discharge treatment in order to render a high degree of wettability thereon. The first surface 1a is provided thereon with the printing ink layer 2 except for a first edge region 1c along either one of the side edges. The second edge region 1d along an opposed side edge of the second surface 1b is subjected to corona electrical discharge treatment C to activate the surface thereof. An adhesive layer 3 is then provided on second edge region 1d. In FIG. 2C, the film F is formed into a tubular shape, and then the second edge region 1d and the first edge region 1c along an opposed side edge are overlapped and bonded with one another through the adhesive layer 3. The first edge region 1c can be securely bonded to the second edge region 1d, since the overall region of the first surface 1a is subjected to color a electrical discharge treatment prior to being provided with the printing ink layer 2. In this embodiment, the printing ink layer 2 of the film tube faces inwardly. However, the film F may be formed into a tubular shape in reverse such that the printing ink layer 2 faces outwardly, as illustrated in FIG. 2D.

Figure 3A:
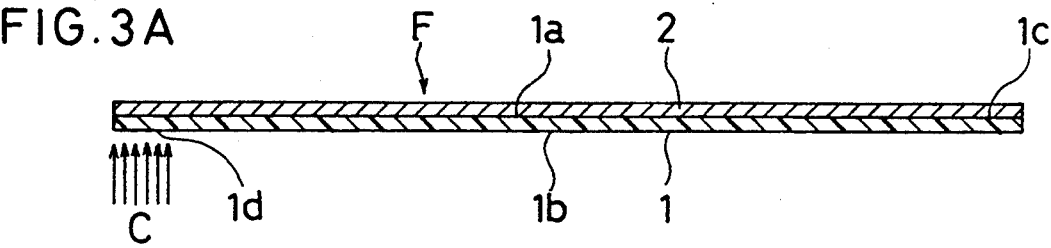
FIGS. 3A and 3B are sectional views illustrating another embodiment of the present invention.
Figure 3B:
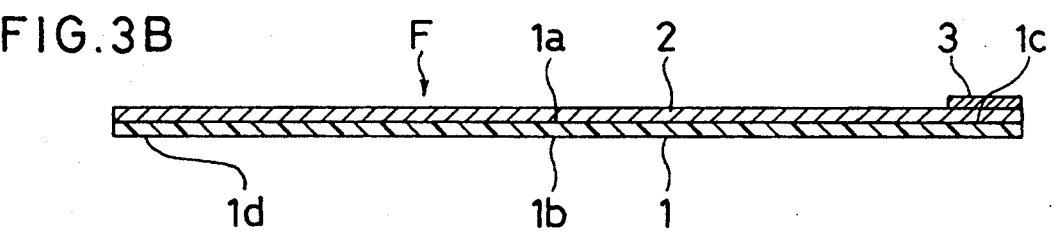
Figure 4A:
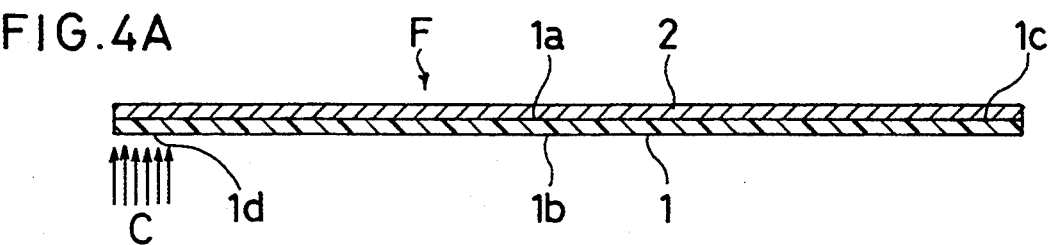
FIGS. 4A and 4B are sectional views illustrating another embodiment of the present invention.

In the first and second embodiments, the first edge region 1c of the first surface 1a is the exposed region of the first surface 1a, since it is not covered with the printing ink layer 2. However, it is to be noted that the first edge region 1c may be covered with the printing ink layer 2. That is, the overall region of the first surface 1a may be covered with the printing ink layer 2 as illustrated in FIGS. 3A and 4A. In FIGS. 3A and 3B, the second edge region 1d of the second surface 1b is subjected to the corona electrical discharge treatment C to activate the surface thereof. The adhesive layer 3 is applied on the first edge region 1c which was previously covered with the printing ink layer 2. The subsequent process for forming of the film tube may be carried out as in the first embodiment.

Figure 4B:
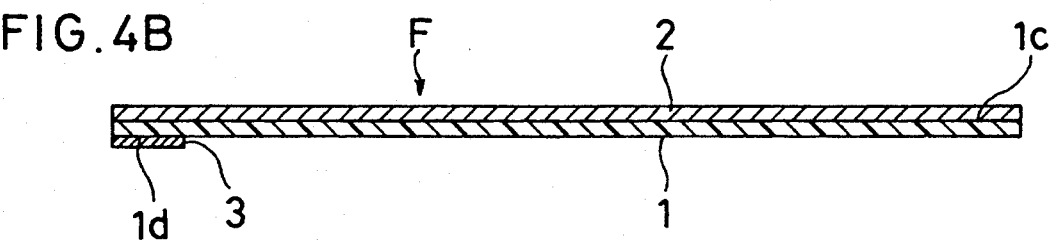

Referring to FIGS. 4A and 4B, the overall region of the first surface 1a is covered with the printing ink layer 2. The second edge region 1d of the second surface 1b is subjected to corona electrical discharge treatment C to activate the surface thereof. An adhesive layer 3 is then provided on the second edge region 1d. The subsequent process for forming of the film tube may be carried out as in the second embodiment.

It is to be noted that the printing ink layer 2 can be bonded to the adhesive layer 3 by selectively using conventional materials used for printing ink and adhesive, for the film tube of the present invention.

Figure 5:
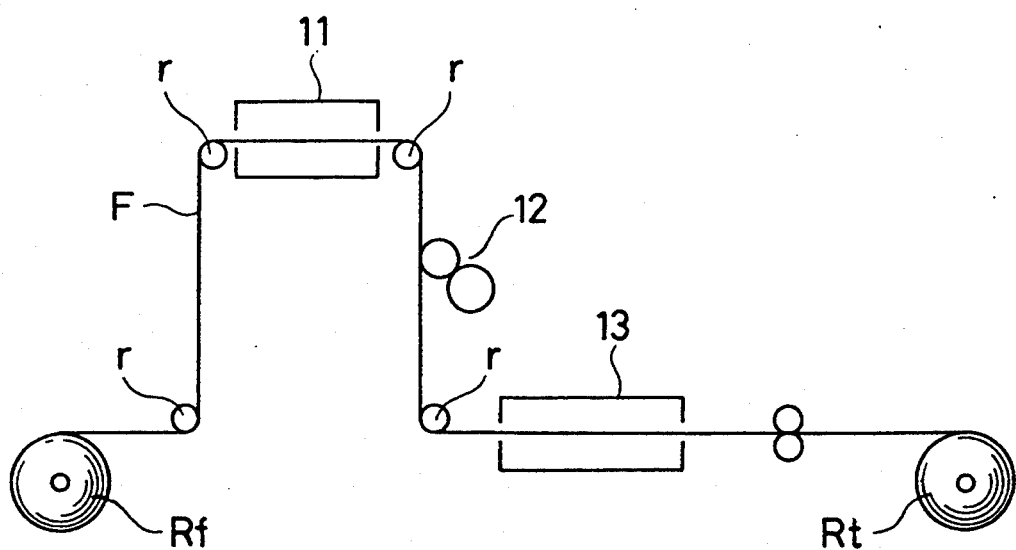
FIG. 5 is a schematic view of the present invention.

FIG. 5 illustrates a schematic view of a manufacturing process for forming the film tube in accordance with the first embodiment of FIGS. 1A, 1B, 1C, 1D and 1E. The drawing in FIG. 5 does not show elements 1a, 1b, 1c, 1d and 2, as shown in the other figures, because of the reduced scale of FIG. 5 in comparison to the other figures. A continuous web of the film F, the first surface 1a of which was subjected to corona electrical discharge treatment and provided thereon with the printing ink layer 2, is unwound from a film roll Rf. Then, the second edge region 1d of the second surface 1b, having a predetermined width such as 10 mm to 50 mm, is subjected to the corona electrical discharge treatment at a station 11. The adhesive layer 3 is applied on the first edge region 1c. The width of the adhesive layer is generally equal to or less than 10 mm, and is preferably 3 to 6 mm. Such widths are commonly employed in a sealing method for making a conventional film tube. Once the film F is passed through the station 11 and 12, it is conveyed to a station 13, where the film F is formed into a tubular shape by overlapping the opposed longitudinal side edges with one another. Then, the film tube is rolled up in a roll Rt.

It is to be noted that the film tube of the first embodiment is formed in the above process, however the above process can be applied to the film tubes of the other embodiments of the present invention.

Further, in the above process, the corona electrical discharge treatment is carried out upstream of the application of the adhesive layer 3. However, the application of the adhesive layer 3 may be carried out upstream of the corona electrical discharge treatment, provided that the adhesive layer 3 is applied on the first edge region 1c of the first surface 1a.

The corona electrical discharge treatment applied to the substrate 1 for increasing the adhesive strength to the adhesive layer 3 and for increasing the adhesive strenght to the printing ink layer 2 can be carried out following a conventional method. The surfaces, activated by the corona electrical discharge treatment, have a high degree of wettability which is preferably more than 37 dyn/cm, and most preferaby more than 39 dyn/cm, as determined by JIS (Japanese Industrial Standard) K6768 testing method. Therefore, it is not necessary to widen the overlapping longitudinal side edges of the film F in order to secure sufficient adhesive strength for forming the film tube or the like, thus, enabling the employment of a general overlapping width (i.e., less than or equal to 10 mm) for making a conventional film tube. In consideration of varying conditions, the material of the adhesive layer 3 is preferably selected from conventional adhesives used for bonding a plastic film, such as a urethane adhesive of two component type. The urethane adhesive of this type includes two different components. One of the components is made of a polyester or polyether synthetic resin having a hydroxyl group on its polymer end and acts as a main agent. The other component is made of a compound having an isocyanate group and acts as a curing agent. These two components are first separated, and then, mixed with one another such that the hydroxyl group reacts with the isocyanate group to cause urethane coupling. Whereby, the urethane adhesive is cured or hardened. Once the film F is passed through station 11 and 12, it can be formed into a tubular shape at station 13 by following conventionally used steps, which do not require special conditions or limitations.

In the above embodiments, polyolefine plastic film is preferably used as the substrate 1. However, other plastic film materials can be used as the substrate 1. In addition, the methods of the present invention can be applied not merely to polyolefine plastic film but also to other plastic film materials. The present methods can be used when forming a film tube of varying materials, which is sealed when the longitudinal side edges are securely overlapped and bonded with one another.

What is claimed is:

1. A method for making a film tube comprising:
   unwinding a roll of a continuous web of a polyolefine plastic film having a first surface, a second surface, and opposed longitudinal side edges, wherein said first surface of said film is priorly subjected to corona electrical discharge treatment and is provided with a printing ink layer;
   subjecting a second edge region along either one of said opposed longitudinal side edges of said second surface of said film to said corona electrical discharge treatment, said corona electrical discharge treatment being confined to said second edge region;
   applying an adhesive layer on a first edge region along an opposed longitudinal side edge of said first surface of said film; and
   overlapping and bonding said first edge region and said second edge region to one another through said adhesive layer.

2. A method for making a film tube comprising:
   unwinding a roll of a continuous web of a polyolefine plastic film having a first surface, a second surface, and opposed longitudinal side edges, wherein said first surface of said film is priorly subjected to corona electrical discharge treatment and is provided with a printing ink layer;
   subjecting a second edge region along either one of said opposed longitudinal side edges of said second surface of said film to said corona electrical discharge treatment, said corona electrical discharge treatment being confined to said second edge region;
   applying an adhesive layer on said second edge region; and
   overlapping and bonding said second edge region and said first edge region along an opposed longitudinal side edge of said first surface of said film to one another through said adhesive layer.

3. A method for making a film tube comprising:
   unwinding a roll of a continuous web of a polyolefine plastic film having a first surface, a second surface, and opposed longitudinal side edges, wherein said first surface of said film has been subjected to corona electrical discharge treatment and, therefore, has wettable surface characteristics;
   subjecting a second edge region along either one of said opposed longitudinal side edges of said second surface of said film to a corona electrical discharge treatment, said corona electrical discharge treatment being confined to said second edge region;

applying an adhesive layer on at least one of said second edge region and a first edge, region along an opposed longitudinal side edge of said first surface; and overlapping and bonding said first edge region and said second edge region to one another through said adhesive layer to form said film tube.

4. The method according to claim 3, wherein said first surface is disposed on an inner surface of said film tube following said step of overlapping and bonding.

5. The method according to claim 3, wherein said first surface is disposed on an outer surface of said film tube following said step of overlapping and bonding.

6. The method according to claim 3, further comprising:

rolling up said film tube.

7. A method for making a film tube comprising:

unwinding a roll of a continuous web of a polyolefine plastic film having a first surface, a second surface, and opposed longitudinal side edges, wherein said first surface of said film has been subjected to corona electrical discharge treatment and, therefore, has wettable surface characteristics;

subjecting a second edge region along either one of said opposed longitudinal side edges of said second surface of said film to a corona electrical discharge treatment, said corona electrical discharge treatment being confined to said second edge region;

overlapping said second edge region and said first edge region along an opposed longitudinal side edge of said first surface of said film; and applying an adhesive layer between overlapped surfaces of said second edge region and said first edge region.

* * * * *